US009912666B2

(12) United States Patent
Chaddha et al.

(10) Patent No.: US 9,912,666 B2
(45) Date of Patent: *Mar. 6, 2018

(54) ACCESS MANAGEMENT FOR CONTROLLING ACCESS TO COMPUTER RESOURCES (71) Applicant: International Business Machines Corporation, Armonk, NY (US)

(72) Inventors: Parmeet S. Chaddha, Foster City, CA (US); Arthur L. Chin, San Mateo, CA (US); Soumitra Sengupta, Belmont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,037

(22) Filed: Jan. 27, 2017

(65) Prior Publication Data

US 2017/0142115 A1    May 18, 2017

Related U.S. Application Data

(63) Continuation of application No. 14/090,181, filed on Nov. 26, 2013, now Pat. No. 9,628,458, which is a
(Continued)

(51) Int. Cl.
*G06F 15/16* (2006.01)
*H04L 29/06* (2006.01)

(52) U.S. Cl.
CPC .......... *H04L 63/10* (2013.01); *H04L 63/0218* (2013.01); *H04L 63/083* (2013.01)

(58) Field of Classification Search
CPC .... H04L 63/10; H04L 63/0218; H04L 63/083
See application file for complete search history.

(56) References Cited

U.S. PATENT DOCUMENTS 5,161,227 A   11/1992 Dias et al.
6,088,679 A    7/2000 Barkley
(Continued)

OTHER PUBLICATIONS

Notice of Allowance (dated Aug. 7, 2013) for U.S. Appl. No. 10/412,549, filed Apr. 11, 2003, Confirmation No. 9022.
(Continued)

*Primary Examiner* — Scott B Christensen
(74) *Attorney, Agent, or Firm* — Schmeiser, Olsen & Watts, LLP; William Hartwell (57) ABSTRACT

A method and system for controlling access to computer resources of a computer data center. A received request to manage an initial service request targets one computer resource and in response: (i) the initial service request is mapped to standard operating procedures pertaining to the one computer resource; (ii) it is determined, based on the standard operating procedures, that additional service requests are to be spawned to service the initial service request and in response, additional service requests are spawned; (iii) the initial service request and the spawned additional service requests are correlated to the one computer resource; and (iv) for each service request (SR) of the initial service request and the spawned additional service requests, the user is granted the requested access of the one computer resource to enable the user to execute the SR, based on selection criteria for selecting a user to execute the SR.

20 Claims, 7 Drawing Sheets

Access Management Datastructures

Related U.S. Application Data continuation of application No. 10/412,549, filed on Apr. 11, 2003, now Pat. No. 8,612,590.

(56) References Cited

U.S. PATENT DOCUMENTS

| | | | |
|---|---|---|---|
| 6,345,278 | B1 | 2/2002 | Hitchcock et al. |
| 6,886,100 | B2 | 4/2005 | Harrah et al. |
| 8,612,590 | B1 | 12/2013 | Chaddha et al. |
| 2001/0007133 | A1 | 7/2001 | Moriconi et al. |
| 2003/0120502 | A1 | 6/2003 | Robb et al. |
| 2014/0082704 | A1 | 3/2014 | Chaddha et al. |

OTHER PUBLICATIONS 312 amendment (dated Nov. 4, 2013) for U.S. Appl. No. 10/412,549, filed Apr. 11, 2003, Confirmation No. 9022.
Amendment (dated Dec. 15, 2011) for U.S. Appl. No. 10/412,549, filed Apr. 11, 2003, Confirmation No. 9022.
312 Communication (dated Nov. 14, 2013) for U.S. Appl. No. 10/412,549, filed Apr. 11, 2003, Confirmation No. 9022.
Office Action (dated Feb. 5, 2013) for U.S. Appl. No. 10/412,549, filed Apr. 11, 2003, Confirmation No. 9022.
Amendment (dated Feb. 10, 2013) for U.S. Appl. No. 10/412,549, filed Apr. 11, 2003, Confirmation No. 9022.
Office Action (dated Feb. 24, 2016) for U.S. Appl. No. 14/090,181, filed Nov. 26, 2013, Conf. No. 2313.
Office Action (dated May 18, 2016) for U.S. Appl. No. 14/090,181, filed Nov. 26, 2013, Conf. No. 2313.
Final Office Action (dated Aug. 5, 2016) for U.S. Appl. No. 14/090,181, filed Nov. 26, 2013, Conf. No. 2313.
Final Amendment (dated Sep. 30, 2016) for U.S. Appl. No. 14/090,181, filed Nov. 26, 2013, Conf. No. 2313.
Advisory Action (dated Nov. 2, 2016) for U.S. Appl. No. 14/090,181, filed Nov. 26, 2013, Conf. No. 2313.
Notice of Allowance (dated Dec. 7, 2016) for U.S. Appl. No. 14/090,181, filed Nov. 26, 2013, Conf. No. 2313.

FIG. 3    Access Manager

Login User
- UserID
- Password ****
- SR
- CR — Not Available
- Applications: App 1, App 2, App 3, App 4, App 5, App 6
- Submit

FIG. 7B

Login Admin
- UserID
- Password ****
- SR/CR ID
- SR
- CR
- Resources: Svr 1, Svr 2, Svr 3, Svr 4, Svr 5, Svr 6 — Not Available
- Submit

FIG. 7C

Access Schedule

| ID | Type | Acct | Start | End | SOP | User & Privileges | Contention Lockouts | Wed Jan 1 (8 9 10 11 12 1 2 3 4 5) |
|---|---|---|---|---|---|---|---|---|
| 224 | SR | ... | ... | ... | ... | ... | | |
| 228 | SR | ... | ... | ... | ... | ... | | |
| 330 | CR | ... | ... | ... | ... | ... | | |
| 331 | CR | ... | ... | ... | ... | ... | | |
| 332 | CR | ... | ... | ... | ... | ... | | |
| 440 | SR | ... | ... | ... | ... | ... | | |

Access Management
FIG. 8

FIG. 9     Demand Regulation

ACCESS MANAGEMENT FOR CONTROLLING ACCESS TO COMPUTER RESOURCES

This application is a continuation application claiming priority to Ser. No. 14/090,181, filed Nov. 26, 2013, now U.S. Pat. No. 9,628,458, issued Apr. 18, 2017, which is a continuation of Ser. No. 10/412,549, filed Apr. 11, 2003, U.S. Pat. No. 8,612,590, issued. Dec. 7, 2013.

BACKGROUND OF THE INVENTION

1. Field of Invention

The field of the present invention relates in general to networks and more particularly to the managing of access on networks

2. Description of the Related Art

The growth of the global network identified as the Internet has in part been spawned by a range of software applications made available on the Internet. These include online catalogs; shopping; financial services; financials management; human resource management; business exchanges; customer relationship management; and entertainment such as news and sports. Each of these online applications requires a complex set of hardware and software for delivery. The hardware elements include at a minimum: firewalls; switches; routers; web, application and database servers and backup devices all of which need to be connected to the Internet. The skill sets required to manage these elements and the associated software are formidable.

The management task is made more formidable by the availability and security requirements for online applications. Typically an online application must target 24/7/365 availability. This availability target dictates the introduction of redundancy into the hardware and software which in turn adds to the complexity of the management task. The security requirements are dictated by the nature of the information, typically highly sensitive, being transmitted and stored by each of the applications. Since the Internet is an open medium the hardware environment used to provide the application is subject to constant threat of attack. Even when information is transmitted securely the packets in which it is bundled may be intercepted. Various measures and countermeasures exists to address each security issue, but they are in a constant state of flux.

Not surprisingly the task of managing and provisioning of Internet applications has fallen on the shoulders of a specialized class of service providers identified as Application Service Providers (ASPs) or Managed Service Providers (MSPs). These service providers may be part of a large enterprise or a separate entity there from. Alternately, these service providers may be part of the businesses that provides a specific application or may exist separately from the business which provides the specific application. They manage and distribute software-based application services and solutions to customers across a wide area network such as the Internet from a central data center on which the applications are hosted. ASPs provide a way for companies to safely outsource key aspects of their information technology (IT) needs that are business critical. A typical ASP manages the hosting of multiple applications for multiple businesses, with each application having its own discrete client audiences. The ASP is thus in a position to justify the considerable investment is personnel, hardware, and software needed to host Internet applications.

Success or failure of an ASP rests on providing personalized solutions for each client group, e.g. corporation, department, division, subsidiary etc. A typical ASP achieves this level of service with a corresponding growth in personnel, which cuts into profitability. What is needed are new service solutions for ASPs which enhance profitability and improve customer responsiveness while leveraging their resources efficiently and productively

SUMMARY OF THE INVENTION

A method and apparatus for access management is disclosed which provides information technology (IT) professionals with an integrated and comprehensive software environment to manage and automate the various processes associated with accessing resources. Resources include: computer hardware and software on one or more networks. Hardware elements include: firewalls; switches; routers; web, application, file and database servers; storage and backup devices. Software elements include: operating systems, web agents, applications, databases as well as anti-virus and tape-backup. The access manager durationally limits a user's access to a targeted resource and logs each and every access along with a service or change request (SRCR) which necessitates the access.

In an embodiment of the invention an apparatus for managing access to a plurality of resources including host servers is disclosed where selected ones of the host servers provide at least one application accessible to users across a network. The apparatus comprises a session manager and a request manager. The session manager couples to the plurality of resources for managing sessions for administrative and non-administrative ones of the users or users including login, authentication and logout to selected ones of the plurality of resources. The request manager couples to the session manager to condition access for administrative ones of the users on access request records each including at least one target resource among the plurality of resources and a time of access to the at least one target resource.

In an alternate embodiment of the invention a method for managing access to a plurality of resources including host servers is disclosed where selected ones of the host servers provide at least one application accessible to users across a network; and the method comprising:

managing sessions for administrative and non-administrative ones of the users including login, authentication and logout to selected ones of the plurality of resources; and conditioning access for each session for administrative ones of the users on corresponding access request records including a target resource among the plurality of resources and a time of access to the at least one target resource.

In another embodiment of the invention computer software, tangibly embodied in a computer-readable storage medium or managing access to a plurality of resources including host servers is disclosed where selected ones of the host servers provide at least one application accessible to users across a network; and the software comprising instructions to perform the following operations:

managing sessions for administrative and non-administrative ones of the users including login, authentication and logout to selected ones of the plurality of resources; and conditioning access for each session for administrative ones of the users on corresponding access request records including a target resource among the plurality of resources and a time of access to the at least one target resource.

BRIEF DESCRIPTION OF THE DRAWINGS

These and other features and advantages of the present invention will become more apparent to those skilled in the art from the following detailed description in conjunction with the appended drawings in which:

FIGS. 7 A-B show the GUIs associated with login administration for an embodiment of the access manager.

FIG. 7C shows a data structure associated with scheduled access management.

DETAILED DESCRIPTION OF THE EMBODIMENTS

A method and apparatus for access management is disclosed which provides information technology (IT) professionals with an integrated and comprehensive software environment to manage and automate the various processes associated accessing resources. Resources include: computer hardware and software on one or more networks. Hardware elements include: firewalls; switches; routers; web, application, file and database servers; storage and backup devices. Software elements include: operating systems, web agents, applications, databases as well as anti-virus and tape-backup. The access manager durationally limits a users access to a targeted resource and logs each and every access along with the service or change request (SRCR) which precipitated the access. Hereinafter the terms service or change requests will be understood to include but are not limited to the following: service and change requests; trouble tickets, incident tickets, help tickets; incident, configuration, problem, change or release management requests etc.

The access manager provides IT professionals a critical tool in maintaining the integrity of complex computer systems by conditioning access to resources not just to a user's privileges but also to the purpose and duration of the user's access. Alternate embodiments of the access manager provide for one or more of: access scheduling and prioritization; contention detection and resolution of access requests; spawning of additional SR-CRs from an initial request based on standard operating procedures (SOP)s for the organization; and assigning users or user selection criteria to SR-CRs. The access manager may integrate or be integrated within a traditional directory, e.g. local directory access protocol (LDAP), or relational database type of access management system.

Figure 1:
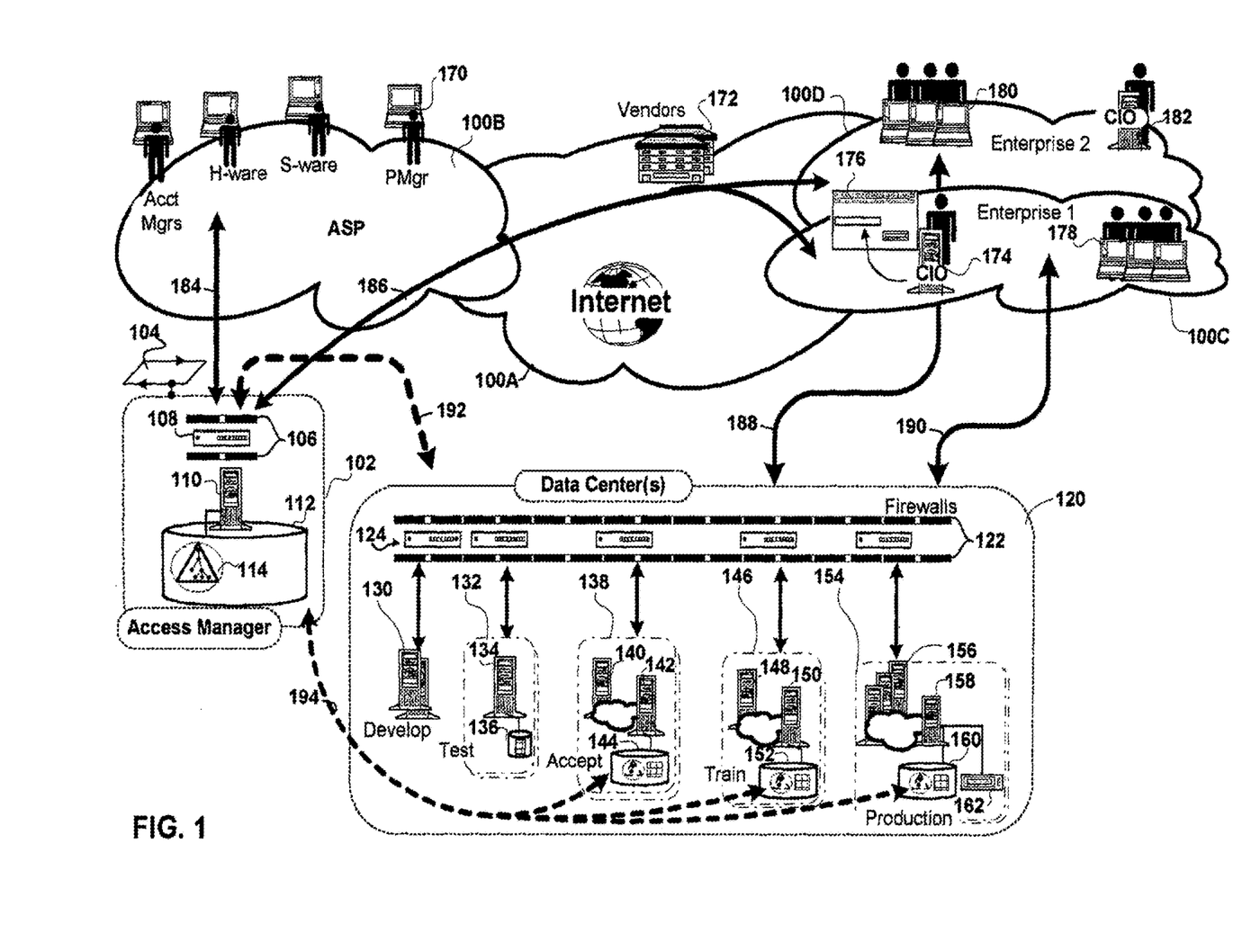
FIG. 1 shows an embodiment of the current invention with an access manager coupled to application hosting servers to control the access thereto.

FIG. 1 shows an embodiment of the current invention with an access manager 102 coupled to one or more data centers 120 to control the access thereto by a plurality of users via associated networks 100A-D to which the access manager and or the data center are coupled. The data center is accessible by both administrative and non-administrative users. Administrative users include: the application service providers (ASP) staff 170, vendors 172, and the chief information officers (CIO) 174, 182 of two different enterprises which utilizing the data center. Administrative users are responsible for the normal upkeep and maintenance of the application, including backups and patch fixing. Non-administrative users include employees 178, 180 of Enterprises 1, 2 respectively which access one or more of the applications hosted at the data center. These include actual business users of the system. The access manager implements processes 104 which control access to the data center(s) by both administrative and non-administrative users.

The access manager 102 comprises, in one of several possible embodiments of the invention: a two-tier firewall 104 coupled to one or more of the networks 100A-D and to the data center(s). The firewall 106 includes a DMZ and a trusted zone with a web agent server 108 in the DMZ and a combined application and database server 110 in the trusted zone. Server 110 is shown coupled to memory or storage 112. The storage includes an access directory 114 in addition to tables, program code and user interfaces. The access directory is implemented with local directory access control (LDAP) or other access control protocol. Collectively these components execute the access control processes 104 of the access manager.

The access manager may, in an embodiment of the invention, be provided by an ASP to manage its technology resources so as to deliver hosted applications to a range of corporate and/or governmental client groups. The access manager may, in an alternate embodiment of the invention, be provided by an enterprise to its client groups, e.g.: vendors, business divisions, partners, select customers, subsidiaries and employees so as to deliver a range of hosted applications to the enterprise at large. In this latter embodiment the actual servers may be deployed at the Enterprise itself and run by its staff or out sourced to one or more ASPs.

The networks to which the access manager is coupled may include: local area networks (LAN), wide area networks (WAN) as well as the Internet. The access manager may manage hosted servers at a plurality of locations.

Two client groups are shown accessing the data center 120. The term "client" will be used interchangeably to refer to a particular user and/or to a computer or other network access device available to the user. The first client group, a.k.a. "Enterprise 1", includes the CIO 174 and employees 178. The second client group, a.k.a. "Enterprise 2", includes CIO 182 and employees 180. The data center includes in this embodiment of the invention: a two-tier firewall 122 coupled to one or more of the networks 100A-D and the access manager 102. The firewall includes a DMZ and a trusted zone with web agent servers 124 in the DMZ and a plurality of application and database servers in the trusted zone. The plurality of servers providing a set of environments to each client group. Each environment is at least logically, and perhaps physically, separate from other environments in the set. All environments within a set have in common at least one application. For example, an environment that exists uniquely on a discrete machine is a physical environment. Environments that exist on different partitions of the same server or set of servers along with other environments of the same or other environmental sets are said to be logical environments.

The data center 120 servers provide an application(s) across a range of environments which collectively form an environmental set. Each application or each client group may require its own environmental set. A typical environmental set includes: a development environment 130, a test environment 132, a user acceptance environment 138, a user training environment 146 and a production environment 154. The environments provide discrete instances of a hosted application(s), each targeted to a different audience and all dedicated to improving the integrity and reducing the downtime of the critical production environment on which all members of a client group depend.

The production environment 154 includes all application components as well as complete client data. Client data flows directly to/from the users within a client group and the corresponding server(s). In a business exchange client data would include: product identification, trade quantities, and pricing. In a CRM application client data would include: customer name, address, and order history. In a financial application client data would include: accounts payable or receivable. Each production environment handles for the corresponding client group the 24/7/365 business of the client group and any of its $3^{rd}$ party business partners. The production environment is typically hosted on multiple physical machines each with one or more of the application components of a networked application which may include: a web agent, an application and a database. In the embodiment shown in FIG. 1 the production environment includes a bank of servers 156 on which the web agent and application are hosted. These are coupled via a local area network (LAN) with a database server 158 on which a database application is hosted. The client data handled by the database application is stored in memory 160 and backed up in a backup storage device 162. The backup storage device is used to recover data in the event of a server failure. In an embodiment of the invention the backup device backs up a plurality of servers across a plurality of client groups and environment sets. Alternatively in other embodiments the environments may also reside in a multi-tenant relationship on a single server.

The user training environment 146 includes all application components as well as such minimal client data as is required to support the training. Each user training environment handles for the corresponding client group the training of new members of a client group on an existing application or of old members of a client group on a new module of an application. All the training is done separately from the production environment so that any errors in the entry of client data by the trainees will not effect the accuracy of the client data in the production environment. The user training environment does not require the bandwidth, speed or capacity of a production environment. Therefore fewer servers are usually utilized. In the embodiment shown in FIG. 1 the user training environment includes a server 148 on which the web agent and application are hosted. This is coupled with a server 150 on which a database application is hosted. The client data handled by the database application is stored in memory 152. No backup is provided since the integrity of the client training data is not critical to the client group.

The user acceptance environment 138 includes all application components and little or no client data. Each user acceptance environment allows employees within a client group to evaluate a new application, upgrade or customization. In the embodiment shown in FIG. 1 the user acceptance environment includes a server 140 on which the web agent and application are hosted. This is coupled with a server 142 on which a database application is hosted. Any client data handled by the database application is stored in memory 144.

The test environment 132 includes all application components as well as such minimal client data as is required to support the testing. Each test environment provides for the information technology (IT) department of the corresponding client group the ability to test a new application or upgrades to an existing application. The test environment requires very little bandwidth, therefore only one server 134 with accompanying storage 136 is provided.

The development environment 130 includes a portion of the application components as well as such minimal client data as is required to support the testing. Each development environment provides for the IT department of the corresponding client group the ability to customize an existing application by adding for example a new report capability. The development environment requires very little bandwidth, therefore only one server is shown.

Any type of application may be hosted across the different environments within a client group's environmental set. Representative applications provided by vendors 172 include: human resource and financial management applications such as PeopleSoft 8™, PeopleSoft Inc., Pleasanton, Calif. 94588-8618; customer relationship management (CRM) applications such as Siebel System 7™, Siebel Systems, Inc. San Mateo, Calif. or business exchanges such as SAPMarkets™, SAP AG Walldorf Germany. The application(s) require other software components to operate. The components required to deliver an application are typically provided by others of the vendors. Software components include: operating systems such as Windows™ 2000, Microsoft Corp. Redmond, W A or Solaris™ 9 Sun Microsystems Inc. Palo Alto, Calif.; a web agent such as Apache, by the Apache Software Foundation, Forest Hill, Md. or IIS™ by Microsoft Corp. Redmond, Wash.; an application such as those discussed above, an application server such as WebSphere™ by IBM Corp. of White Plains N.Y. or WebLogic™ by BEA Systems of San Jose, Calif.; a database such as MS SQL™ Server by Microsoft Corp. of Redmond, Wash. or Oracle 9i™ by Oracle of Redwood Shores, Calif. and additional components such as anti-virus and tape-backup software for example.

In the embodiment shown in FIG. 1 the data center may be accessed directly by the members of each client group via access paths 188-190 or indirectly via access paths 184, 186 through the access manager and access path 192 from the access manager to the data center. In either case the access manager controls access via a master access directory 114 which has a parent-to-child relationship with one or more LDAPs within the various environments and applications supported by the data center. The parent child relationship and the integrity thereof is maintained using the LDAP protocol over link 194 between the access manager and the data center(s).

Figure 2:
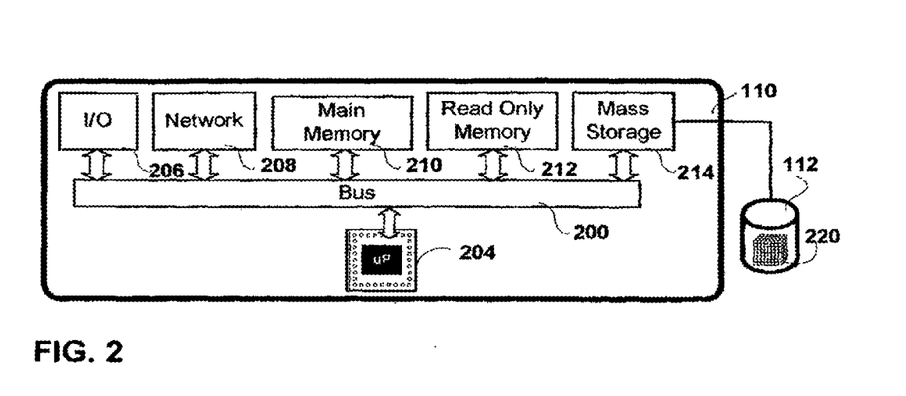
FIG. 2 is a hardware block diagram of a computer suitable for use in executing the processes associated with the access manager shown in FIG. 1.

FIG. 2 is a hardware block diagram of a computer suitable for use in executing the processes associated with the access manager shown in FIG. 1. The hardware blocks associated with the access manager server 110 are shown. The access manager server includes: an input output (I/O) module 206, a network interface card (NIC) 208, a main memory 210, a read only memory (ROM) 212, a mass storage driver 214 and a processor 204 coupled to one another via a system bus 200. The I/O module handles the user interface devices such as the keyboard and display (not shown). The NIC handles the packetized communication of the access manager server with both the external networks 100A-D via the firewall as well as with the data center via a virtual private network (VPN) or other secure links. The ROM is a non-volatile memory which stores the basic input/output system (BIOS) for the server. The main memory is a random access memory (RAM) which stores data and instructions on which the processor is operating. The instructions come from program code and applications stored in non-volatile memory 112. The server is coupled with the memory via the mass storage driver which handles the details of reading and writing data. The memory stores files 220 which include: the program code, tables and graphical user interfaces (GUI)s for implementing the access manager processes and interfacing with the administrative and non-administrative users. The term "computer readable storage device" does not encompass a signal propagation media such as a copper cable, optical fiber, or wireless transmission media.

Figure 3:
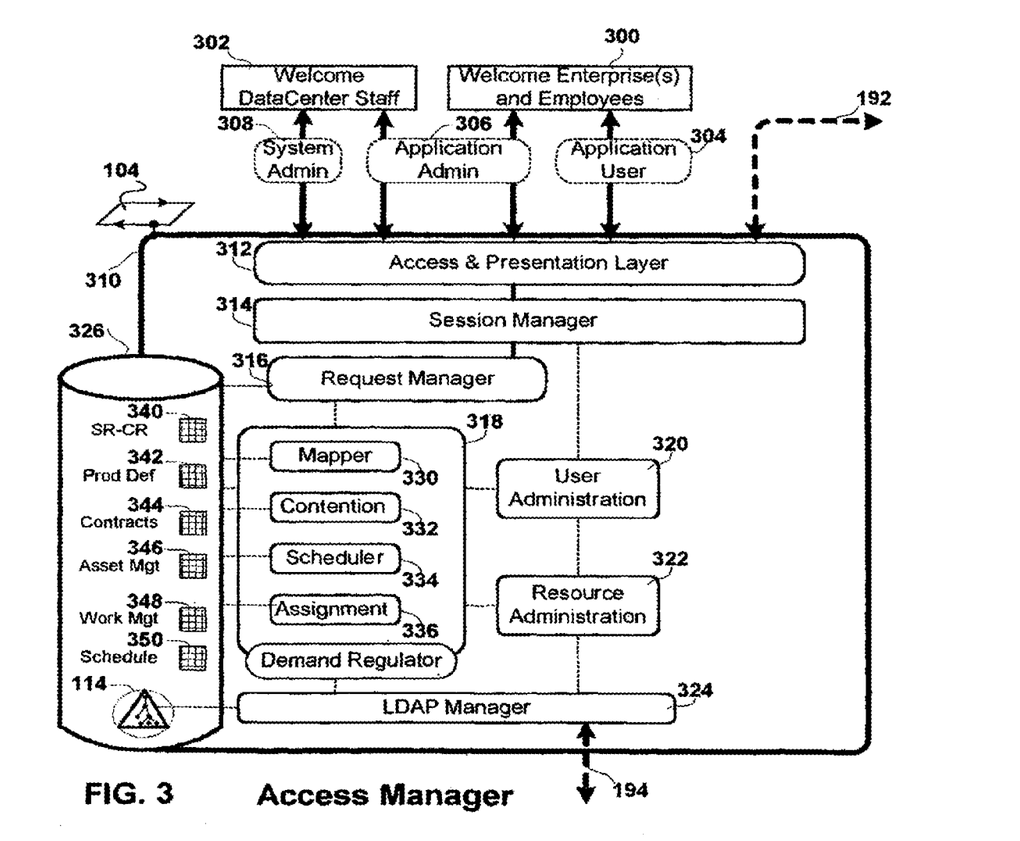
FIG. 3 is a software block diagram of an embodiment of the access manager shown in FIG. 1.

FIG. 3 is a software block diagram of an embodiment of the access manager shown in FIG. 1. The access manager includes a database portion 326 and an application portion 310. The database portion 326 includes the various tables 340-350 and LDAP directory 114 associated with various embodiments of the access manager. The application portion provides a plurality of modules for managing access to the data center. These include: an access and presentation layer 312, a session manager 314 a request manager 316, user and resource administration modules 320-322 respectively, and a demand regulator module 318. The access controller and presentation layer controls access to the access manager and the presentment of graphical user interfaces (GUI)s associated therewith. The session manager manages the session for each administrative and non-administrative user including login, authentication and logout.

The request manager requires for administrative sessions a corresponding access request record, e.g. a service request or a change request a.k.a. incident ticket or trouble ticket, which includes a target resource among the plurality of resources at the data center and a time span of access to the target resource. The demand regulator request manager manages the enforcement of the durational limits and/or lockouts for each SR-CR during its execution. The request manager manages the setup of new SR-CRs and often the closure of completed SR-CRs which are stored in the request table 340 in the database 326. In selected embodiments of the invention a demand regulator 318 is included. The demand regulator interfaces with the database and the various tables therein to perform one or more of the tasks of: a) mapping of demand, b) identification of contention within the existing demand, c) scheduling demand, and d) assigning users to the existing demand.

The mapping of demand is handled by the mapper 330 component of the demand regulator which correlates each new SR-CR with both SOPs and target assets using the product definition table 342 and the asset management tables 346 in the database. Additionally, where a related SOP calls for additional SR-CRs the mapper spawns those related <<child" SR-CRs and injects them into the SR-CR request table 340. The identification of contention is handled by the contention detector 332 component of the demand regulator which identifies contention between the new and existing SR-CRs in the request table 340 and defines any required lockouts to prevent the contention. Contention definition for resource asset so changes do not overwrite each other or that an asset is shut down while others are using asset, resources not overloaded with other requests or priorities. Scheduling of demand is handled by the scheduler component of the demand regulator which prioritizes SR-CRs based on parameters from the SR-CR table 340 such as severity and type and or parameters from the contract table 344 such as service level agreements (SLA), and which schedules the SR-CRs in the access schedule table 350 to reflect the determined priorities and the contention identified by the contention detector. The assignment of users to existing demand is handled by the assignment component 336 of the demand regulator using the work management table 348 to determine employee availability and skill sets to assign specific users or user types to each SR-CR for execution of same. In embodiments of the invention which include the demand regulator, that regulator may contain selected ones or all of the above discussed mapper, contention, scheduler, and assignment components without departing from the scope of the claimed invention. In embodiments of the invention which include the demand regulator the request manager interfaces with both the SR-CR table as well as the access schedule table to manage requests. The user administration module 320 handles the setup and deletion of users and the assignment and recordation of access privileges associated therewith in the LDAP directory 114 via the LDAP manager module 324. The resource administration module 322 couples to the asset management table 346 and handles the setup and deletion of resources including hardware, software, and networks and the recordation of access privileges associated therewith in the LDAP directory via the LDAP manager module. The LDAP manager handles the LDAP functions for the parent LDAP directory 114 in the database and also manages via secure link 194 the child directories on the various servers at the data center.

The access manager may perform in alternate embodiments of the invention as a gateway for access to the data center or as a remote regulator of direct accesses to the data center. Where the access manager performs as a gateway both data center staff 302 and enterprise employees 300 gain access to the data center via the access manager. The data center staff accesses comprise: system administrative accesses 308 and application administration accesses 306. The enterprise employee accesses comprise: administrative and non-administrative application accesses 306, 304 respectively. If access is approved it is made via link 192 to the data center. Where the access manager performs as a remote regulator of direct administrative and non-administrative accesses to the data center the various LDAP implementations on the associated servers are set up to require access permissions from the access manager via link 194 as a condition precedent to direct administrative and non-administrative accesses to the data center.

Figure 4:
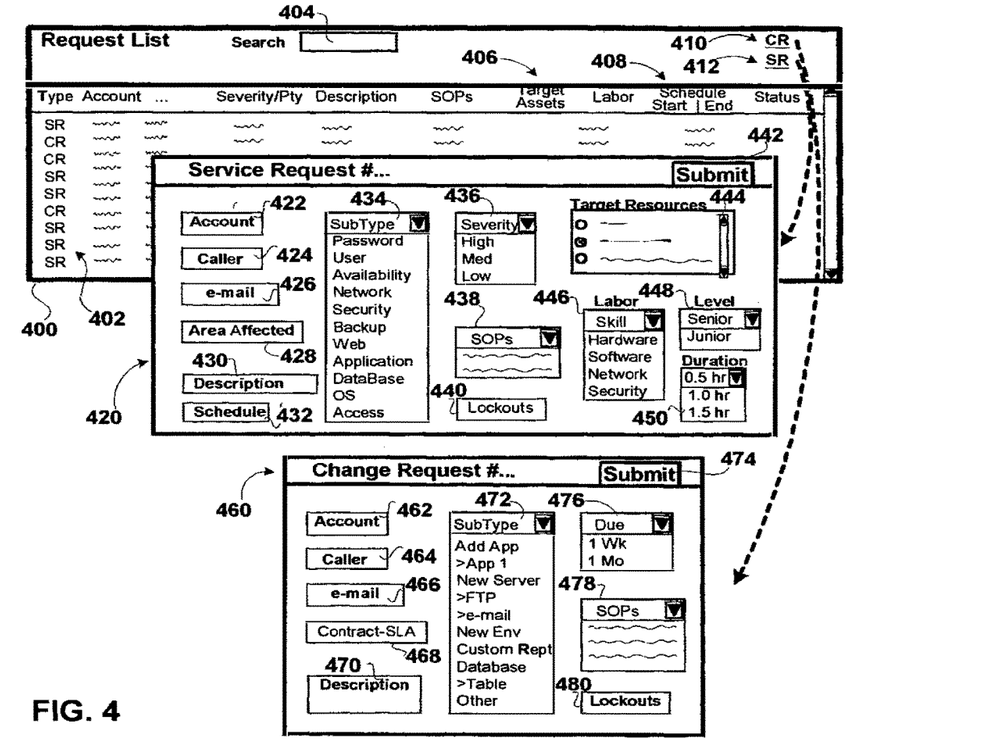
FIG. 4 shows graphical user interfaces (GUI)s associated with service and change requests targeted for the data center shown in FIG. 1.

FIG. 4 shows graphical user interfaces (GUI)s associated with an embodiment of the service and change requests which may be targeted for the data center shown in FIG. 1. GUI 400 is a list of the current pool of SR-CRs in the SR-CR table 340 (See FIG. 3). Each row on the list, e.g. row 402, corresponds with a SR-CR record. Columns of the list contain the various parameters associated with a SR-CR including: type; account; severity or priority; description; SOPs; target assets 406; schedule 408; and status, e.g. open or closed. A search icon 404 allows an individual SR-CR to be located. SR-CRs can be added via icons 412, 410 respectively. Standard search and filter icons not shown here can be used to filter the list by date, by status, etc.

Selection of the add service request icon 412 results in the display of the SR form GUI 420. The form has input fields for entering various parameters associated with a service request including in an embodiment of the invention the following: account 422; caller 424, i.e. user making the request; e-mail 426; the area affected 428, e.g. a particular application or server or environment; description 430; schedule 432, e.g. start and stop time; sub-type 434; severity 436; related SOPs 438; associated lockouts 440; target resources 444; labor 446; skill level 448; duration 450. A submit icon 442 allows the entry of a new SR-CR record into the request list 400. Not all parameters are necessarily entered at time of generation of the service request. Some may be automatically entered by the demand regulator 318 (See FIG. 3). Some may be entered manually by a central request administrator for example.

Selection of the add change request icon 410 results in the display of the CR form GUI 460. The form has input fields for entering various parameters associated with a change request including in an embodiment of the invention the following: account 462; caller 464, i.e. user making the request; e-mail 466; contract SLA 468; description 470; sub-type 472; completion timeframe 476; related SOPs 478; and associated lockouts 480. A submit icon 474 allows the entry of a new SR-CR record into the request list 400. Not all parameters are necessarily entered at time of generation of the service request. Some may be automatically entered by the demand regulator 318 (See FIG. 3). Some may be entered manually by a central request administrator for example. Additional parameters not on the entry form, such as schedule may be automatically entered at a later time by the demand regulator, or manually entered via an associated form.

The optional lockout fields 440 and 480 on the SR-CR respectively may be manually entered by the administrator generating a SR-CR or by an overall administrator for the access manager. Alternately, lockouts may be dynamically added and removed by the access manager based on SOPs which define access contention resolution rules.

Figure 5:
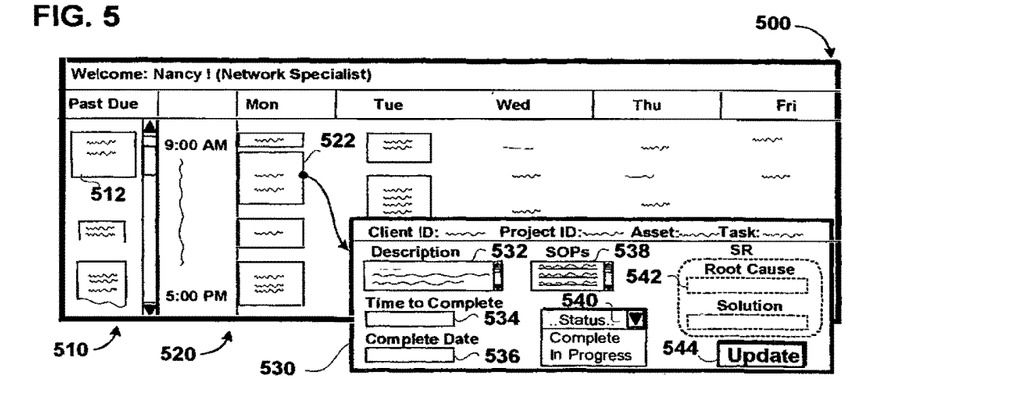
FIG. 5 shows GUIs associated with access scheduling for an individual member of the information technology (IT) staff.

In alternate embodiments of the invention the SR-CR may contain one or more of the fields shown in GUIs 420 and 510 as well as such additional fields as may be required to manage an SR-CR. One such additional field is a contact ID field (not shown) which lists a managerial or other contact for the SR-C, and the conditions under which they would be contacted: e.g. upon start, completion, delay or extension of the handling of the SR-CR.

Another such field is a linkage field (not shown) which allows the requestor or the access manager to manually or automatically link one SR-CR to one or more SR-CRs. Alternately this linkage may be specified by the SOPs with which an SR-CR may be associated.

Figure 6:
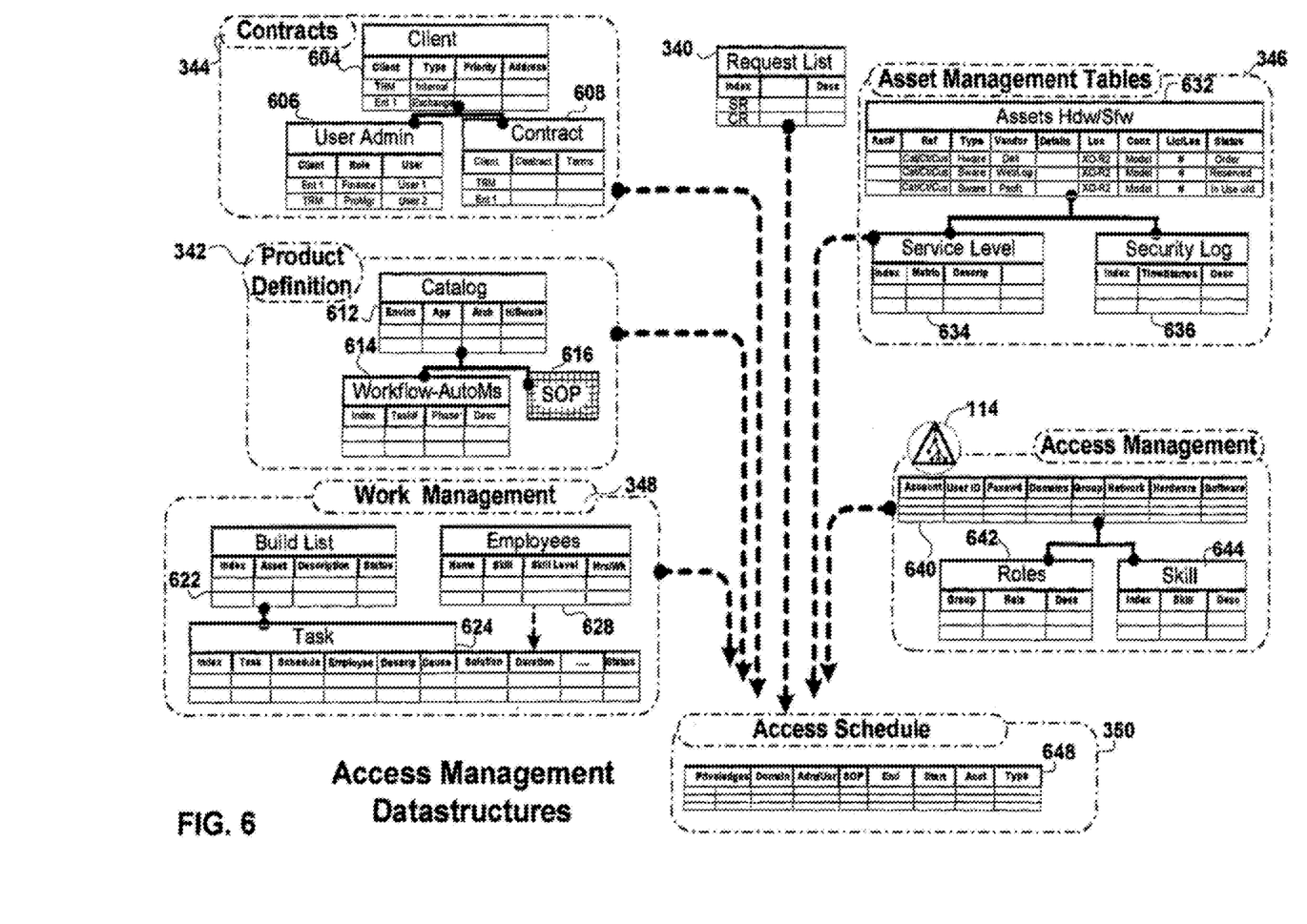
FIG. 6 shows various data structures for access management associated with various embodiments of the invention.

FIG. 5 shows GUIs associated with an embodiment of the invention where the demand regulator 318 (See FIG. 3) includes access scheduling. The GUIs show a detailed 530 and overall 500 views of a portion of the SR-CR schedule for an individual member of the data center staff The personal schedule GUI 500 includes a past due portion 510 in which past due tasks, e.g. task 512 are displayed and a scheduled portion 520 with icons representing each task, e.g. task 522, displayed in a scheduled format. Selection of an individual icon results in display of GUI 530 in which details of the SR-CR task are shown. SR-CR task parameters include: client, project, asset, and task identifiers such as: description 532, SOPs 538 etc. When a staff member has completed an SR-CR task they enter: time to complete 534, completion date 536 and status 540, and submit the data by selection of update button icon 544. The systematic identification of time to complete allows closed loop, feedback as to estimated vs. actual time to complete a SR-CR task. Where the task relates to a service request the staff member also enters service request resolution parameters 542 including root cause and solution. The systematic identification of root cause, e.g. asset, SOP, workflow etc. and solution provides the closed loop feedback required to improve SOPs and workflows for example. FIG. 6 shows various data structures for access management associated with various embodiments of the invention including: the contract management tables 344, the product definition tables 342, the asset management tables 346, the work management tables 348, the SR-CR table 340, the access management directory 114, and the access schedule 350. The contract management tables include: client table 604, user administration table 606 and contract table 608. The contract table contains the SLAs for each client. The product definition tables include: the catalog 612, the workflow and automations table 614 and their related SOP tables 616. The asset management tables include: the asset table 632, the service level metric table 634 and the security log 636. The asset table 632 may contain a number of relational tables, e.g. customer, environment, hardware, software, etc. The service level metric table correlates the SLAs in a client's contract with corresponding assets. In an embodiment of the invention the SLA's can be utilized by the access manager to prioritize the handling of SR-CRs for a single customer or among customers. For example, SR-CRs for a customer with a premium SLA guaranteeing a high level of availability might be scheduled before a similar SRCR for another customer with a basic SLA with a lower level of availability. Alternately or additionally, the access manager could prioritize SR-CRs based not only on contractual SLA levels but also the actual service levels delivered over a relevant time period and schedule them so as to avoid downtime beyond that consistent with the corresponding SLA. Alternately or additionally, the access manager could take into account in prioritizing an SR-CR the probable cause of the failure which necessitated the SR-CR and give higher priority to those SR-CRs where responsibility rests with the ASP. The work management tables include: the employee table 628, the build list 622, and the task table 624. The work management table allows employees skill level, workload and performance to be determined. The SR-CR table 340 contains the service and change requests. The access management directory 114 contains various tables or trees including in an embodiment of the invention an access table 640, a role table 642 and a skill table 644. The access schedule 350 contains the access schedule table 648 (See FIG. 7C). One or more of these tables are implemented in various embodiments of the invention to contain the data managed by either or both the request manager 316 and the demand regulator 318 shown in FIG. 3.

In an embodiment of the invention the only tables required by and maintained by the access manager are the request list 340 and the access schedule table 648. In this embodiment of the invention the access manager enforces a simple set of time or resource based access contention rules which avoid access contention and schedules SR-CRs accordingly. Alternately, the access manager may allow user self scheduling where each scheduling request is accepted or rejected based on its conformance with the access contention rules.

In an alternate embodiment of the invention the access schedule table 648 may be archived and utilized as an access history.

FIGS. 7A-B show the GUIs associated with login administration for an embodiment of the access manager.

GUI 700 shown in FIG. 7A shows an embodiment of a login interface for a non-administrative user. The login interface GUI includes: a user ID input field 704; a password input field 706; a drop down list 712, and button icons 708-710 for adding a service or change request respectively. Initially the login GUI contains only the User ID and password fields 704-706. After refresh the Gill is updated to include the additional fields 708-712. The drop down list 712 or other graphical icon(s) are dynamically generated based on the identify of the user and the applications and/or modules and sub-modules thereof to which the user is allowed access as determined by the access manager. The dropdown list 712 shows a set of Applications 1-6 to which the user would usually have access. In an embodiment of the invention which includes lockouts any applications subject to a temporary lockout due to the handling of a related SR-CR would be unavailable for access. Graphically a method of presentment of such status, i.e. lockout, is shown in FIG. 7A where Application 2 listing includes lockout indicia 718, a gray highlight, and Application 6 includes lockout indicia 714, the gray highlight. In an embodiment of the invention the selection of an application subject to lockout as indicated by the lockout indicia would result in the presentment of an explanation page listing the reasons and estimated downtime for the Application. Additionally, relevant portions of the associated SR-CRs may be displayed so that the inquisitive user may track actual troubleshooting and resolution. The GUI 700 also allows a user to enter a service or change request. Selection of the service request button icon 708 results in presentment to the user of a form for entering a service request, e.g. form 420 (See FIG. 4). Selection of the change request icon 710 results in presentment of a form for entering a change request, e.g. form 460 (See FIG. 4).

GUI 720 shown in FIG. 7B shows an embodiment of a login interface for an administrative user of either an enterprise client or a member of the data center staff. The login interface GUI includes: a user ID input field 724; a password input field 726; an inline frame 734, and button icons 730-732 for adding a service or change request respectively. Initially the login GUI contains only the User ID and password fields 724-726. After refresh the GUI is updated to include the additional fields 728-734. The inline frame 734 or other graphical icon(s) are dynamically generated based on the identify of the administrator and the resources, e.g. hardware, software, customers, environments, etc. to which he/she is allowed access as determined by the access manager. Inline frame 734 shows a set of target resources, e.g. Servers 1-6 to which the administrative user would usually have access by virtue of their privileges listed in the LDAP. In an embodiment of the invention which includes lockouts any target resources subject to a temporary lockout due to the handling of a related SR-CR would be unavailable for access. Graphically a method of presentment of such status, i.e. lockout, is shown in FIG. 7B where Server 2 listing includes lockout indicia 740, a gray highlight, and Server 6 includes lockout indicia 736, the gray highlight. In an embodiment of the invention the selection of a resource subject to lockout as indicated by the lockout indicia would result in the presentment of an explanation page listing the reasons and estimated downtime for the Application. Additionally, relevant portions of the associated SR-CRs may be displayed so that the administrator may track or participate in actual troubleshooting and resolution. The GUI 720 also allows a user to enter a service or change request. Selection of the service request button icon 730 results in presentment to the user of a form for entering a service request, e.g. form 420 (See FIG. 4). Selection of the change request icon 732 results in presentment of a form for entering a change request, e.g. form 460 (See FIG. 4).

In an embodiment of the invention in which self selection and scheduling of SRCRs is allowed an administrator could proceed directly from generating an SR-CR via icons 730-732 to executing them, provided only that the access manager determined based on simple or complex access management processes that there was no current contention between administrative or other users for the targeted resource(s). In an additional embodiment based thereon, the access manager could then re-schedule outstanding SR-CR's accordingly. FIG. 7C shows a data structure associated with scheduled access management. An embodiment of the access schedule table 646 is shown. That embodiment of the table includes individual rows of SR-CR records with columns of parameters including: ID 750, type 752, account 754, start time 756, end time 758 related SOPs 756, assigned user or user type 758, contention lockouts 760, and a graphical timeline 762.

Figure 8:
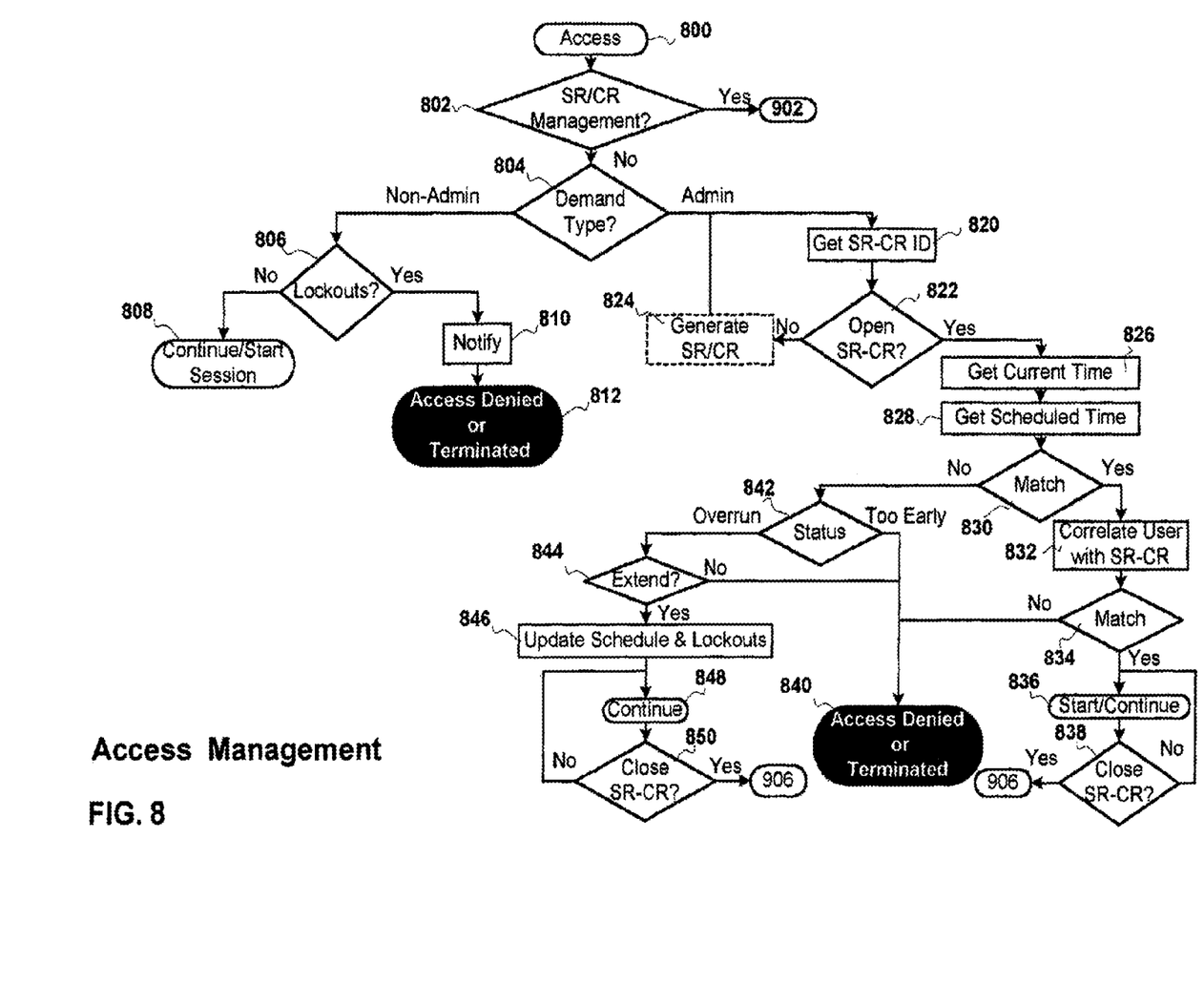
FIG. 8 is a process flow diagram showing the processes associated with an embodiment of the access manager.

FIG. 8 is a process flow diagram showing the processes associated with an embodiment of the access manager. In this embodiment of the invention the access manager requires that a user logging onto any of the managed hardware or software components of the hosted system have both a privilege to access the targeted component together with an explicit purpose and time span for doing so. The privilege for a typical user will involve one or more applications, and for a typical administrator will encompass many of the managed hardware or software components. These privileges will be defined in the LDAP 112 (See FIG. 1) of the access manager and one or more of the satellite LDAPs within the managed components. The explicit purpose and time span for access is in this embodiment of the invention captured in a SR-CR record. The system handles automated logoff as well as the setting of any lockouts of related hardware or software that may be explicitly called for in the SR-CR record or that may be associated with the SR-CR via a SOP.

Processing begins with an access 800 by a user or administrator to a service delivered by or a resource controlled by the access manager. Resources include software or hardware the access to which is controlled by the access manager 102 (See FIG. 1). Software includes: applications, servers (web, application, database), scripts, services, operating system, antivirus, security, directories, tables, utilities, monitoring, automations, etc.

Figure 9:
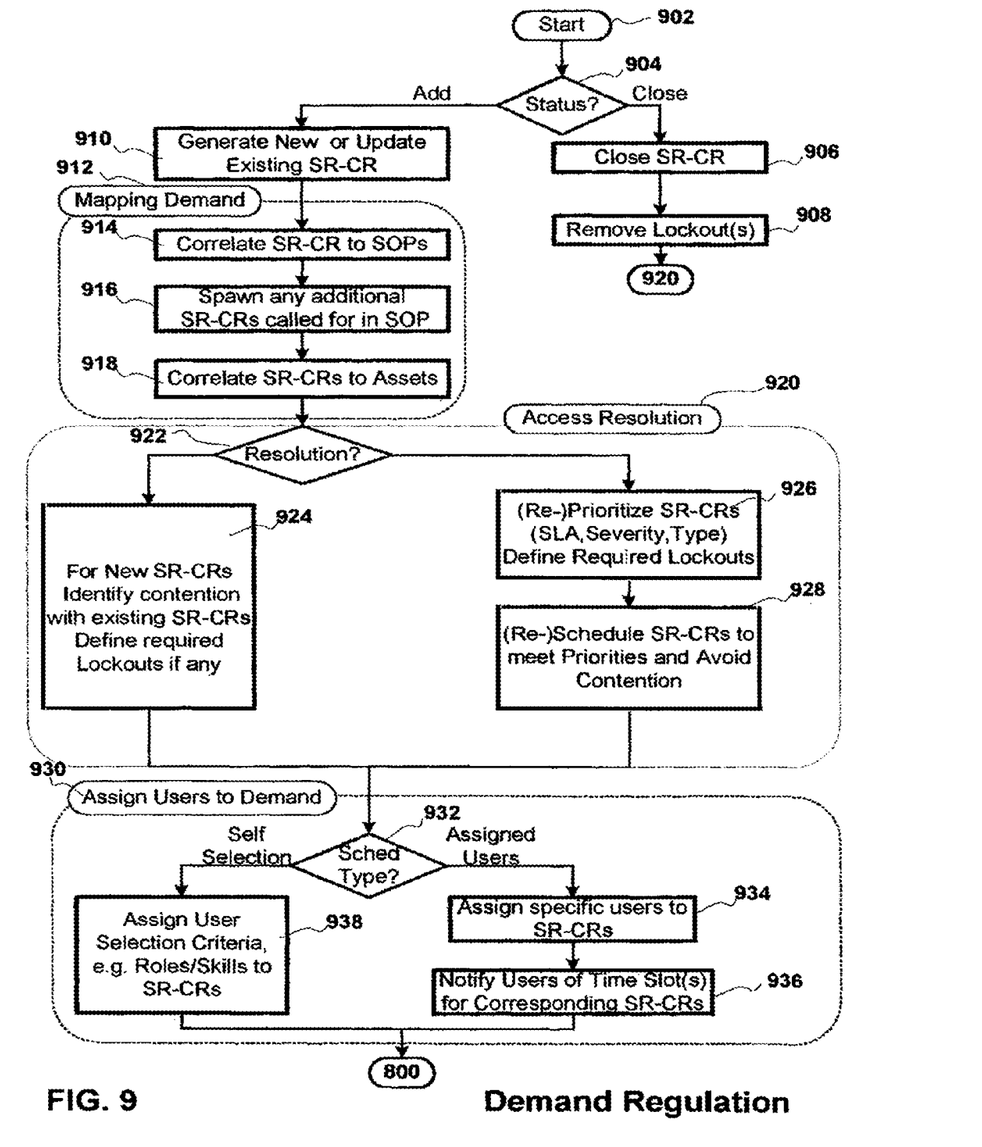
FIG. 9 is a process flow diagram showing the processes associated with an embodiment of the access manager.

Hardware includes: computers, servers, switches, routers, appliances, storage devices, etc. In decision process 802 a determination is made as to whether a request for a service delivered by the access manager, e.g. service and change request management is requested. Service and change request management (SCRM) includes: opening, updating, and closing of service and change requests. If the access request is for SCRM services then control passes to decision process 902 shown in process flow 902. If the access request is not for SCRM services then control passes to decision process 804 in which the type of demand is determined. Demand at this stage is categorized as administrative and non-administrative. Examples of non-administrative demand include access to: a business exchange, a CRM or a financial application by a non-administrative user. Examples of administrative accesses include all accesses concerned with administration of applications or the hardware and software on which they are hosted. Non-administrative accesses are passed to decision process 806. In decision process 806 a determination is made as to whether any lockouts apply to the application or particular module thereof to which the non-administrative user access is requested. Lockouts may be manually or automatically set and typically span an interval during which a SRCR is being fulfilled. Lockouts are intended to deny user access, in this case to a high level application or module thereof, when service and change request fulfillment requires exclusion of access to the upper level application. Lockouts may be manually set during the generation or update of a SR-CR or they may be automatically set by the access manager using standard operating procedures (SOP)s which correlate service and change requests with corresponding lockouts. If there is a lockout then the user will be notified in process 810 that their access is denied, or in the event they are already in a session, that their session is terminated 812. If no lockout is in place then control passes from decision process 806 to block 808 in which the users session is started or if already in progress, continued.

Where the users access is administrative in nature control passes from decision process 804 to process 820 in which the user in which the SR-CR number which accompanies the administrative access is determined. If this access marks a start of a new session then the user will be given the opportunity to enter the SR-CR on the login GUI Alternatively, if a session is already in progress then the SR-CR identifier will be stored in a session log for example. Next in decision process 822 a determination is made as to whether the identified SR-CR is open. If the ID corresponds with a closed SR-CR or if no ID is supplied then control passes to process 824 in which a SR-CR is generated. In an embodiment of the invention the SR-CR may be generated with the full range of demand regulation processes shown in FIG. 9 starting at decision process 902. In an alternate embodiment of the invention with very limited demand regulation capability the SR-CR will be generated "on the fly" and will only include: a start and stop time entered by the user and a target resource to which the access is requested over the time span. Control will then loop back to decision process 820.

When an ID for an open SR-CR is presented control passes to process 826 in which the current time is determined. Next in process 828 the scheduled start and stop time of the identified SR-CR is determined from the access schedule 648 (See FIGS. 6, 7C). In an embodiment of the invention the scheduled start and stop time may be simply the times entered by the user for the SR-CR, i.e. self-scheduling. In an alternate embodiment of the invention schedules for all SR-CRs may be automatically generated by the access manager (See FIG. 9) or an SR-CR administrator whose task is to schedule SR-CRs. This latter form of scheduling shall be identified as aggregate scheduling since it takes into account all outstanding SR-CRs. Next in decision process 830 a determination is made as to whether the current time falls within the interval spanned by the SR-CR. If it does then control passes to process 832 in which the administrative user's name and password is referenced against an access directory for the managed system. In an embodiment of the invention the access directory includes a direct mapping of users to resources including the resource(s) targeted by the identified SR-CR. In an other embodiment of the invention access privileges of user's to resources include one or more levels of indirection with users and target resources correlated with one another by classifications such as: groups, roles, skill sets etc. Next in decision process 834 a determination is made as to whether the user has access rights to the resources targeted by the SR-CRs. If they do have the appropriate access rights the session will be started or continued in process 836. During the session users will be allowed to close the SR-CR. When such a request is detected in decision process 838 control is passed to process 906 (See FIG. 9) for the closing of the SRCR. If they don't have the appropriate access rights control passes to process 840 where access is denied and/or the session is terminated.

Where the current time does not fall within the time span of the SR-CR control passes from decision process 830 to decision process 842. In decision process 842 a determination is made as to whether the current time falls before or after the time span of the accompanying SR-CR. If an access request time is before the scheduled start time for the SR-CR then control passes to process 840 in which access is denied. Alternately, if an access request time is after the scheduled ending time for the SR-CR then control is passed to decision process 844. In decision process 844 a determination is made as to whether the time span of the accompanying SR-CR can be extended. This decision may be automatic involving only a notification of relevant users, or semi-automatic requiring both notification and an affirmative response. If the access is not extensible then control passes to process 840 in which access is denied or the session is ended. If the access request is extensible then control passes to process 846 in which the access manager updates the entire access schedule to accommodate the extension and the accompanying lockouts are extended. Next in process 848 the access is allowed and the session is continued. During the session users will be allowed to close the SR-CR When such a request is detected in decision process 850 control is passed to process 906 (See FIG. 9) for the closing of the SR-CR In an alternate embodiment of the invention additional processes may be executed by the access manager to notify the administrative user of the time remaining for the handling of an SR-CR.

FIG. 9 is a process flow diagram showing the processes associated with an embodiment of the access manager which includes demand regulation. Demand regulation adds additional overlays of access management processes to those shown in FIG. 8 including: mapping demand, identifying contention within the demand pool, scheduling demand, and correlating users with demand. Processing begins in start block 902 from which control is passed to decision process 904. In decision process 904 a determination is made as to whether the SR-CR management request involves adding or closing an SR-CR In alternate embodiments of the invention additional processes may be added for updating an SR-CR Processing of SR-CR closure requests passes to processes 906-908 in which the SR-CR is closed and associated lockouts removed respectively, after which control passes to the access resolution process block 920.

Where a new SR-CR is to be opened control passes to process 910 in which a new SR-CR is generated. Next control passes to the demand mapping process block 912 the first process of which 912 involves correlating the new SR-CR with appropriate SOPs, if any. The successful correlation of an SR-CR with one or more SOPs allows the knowledge embedded in the SOPs to be applied to the handling of the SR-CRs. The SOP may call for: additional service requests to be spawned; lockouts that need to be implemented and parties to be notified. The SOP may proscribe a sequence in which the related service requests, lockouts and notifications need to be performed. Correlation of a service or change request with a SOP may be accomplished manually, semi-automatically or automatically. In an embodiment of the invention with manual correlation a user decides which SOPs are related and tags them to the new SR-CR In an embodiment of the invention with semi-automatic correlation, the access manager scans the SOP's to find those which contain keywords which match the parameters of the new SR-CR and presents those to a user who then tags selected ones of the SOPs to the new SR-CR. In an embodiment of the invention with automatic correlation the access manager performs the search and tagging automatically based on keyword and other forms of parametric matching. After the SR-CR is associated with any SOPs, control passes to process 916 in which any additional SR-CRs called for in the related SOP(s) are spawned. Next in process 918 the new SR-CR and any related SR-CRs that have been spawned are correlated with the appropriate assets. This process allows the request embodied in the SR-CR, e.g. an application that is not functioning for a particular account, a database that needs a refresh for several accounts, a user that needs to be added for a particular group, etc. to be correlated with target assets/resources. The process may be handled manually by an administrator who looks up for a particular customer the particular hardware and software associated with that customer and specifically the hardware and software implicated by the SR-CR. Once this relationship is complete the SR-CR is tagged with a pointer to the target resources/assets. In another embodiment of the invention process 918 may be performed automatically using keyword and other parametric identifiers in the SR-CR to scan the asset management tables 630 for target assets/resources.

After the demand mapping processes are complete, control passes to the access resolution block 920 and specifically to the decision process 922. In decision process 922 a determination is made as to whether access is controlled on the basis solely of avoiding access contention or alternately on the basis of contention avoidance and scheduling. In the former case control passes to process 924. In the latter case control passes to process 926.

In process 924 contention identification can in alternate embodiments of the invention be identified manually by an administrator or automatically by a parametric search among the pool of SR-CRs handled by the access manager. In this process the new SR-CR and any associated spawned SR-CRs are compared with existing SR-CRs along a number of parametric axis to determine overlap. Where the SR-CR comes with a requested start-stop time as well as a target resource the corresponding time span is compared with other SR-CRs in the demand pool which target the same resources and the potentially contenting SR-CRs are identified. Where the SR-CR comes with only with a target resource other SR-CRs which target the same resources and therefore potentially contend with the new SR-CRs are identified. After potential sources of contention are identified each new SR-CR is tagged with the corresponding lockouts.

In an embodiment of the invention lockouts are defined simply in terms of other SR-CRs the execution of which cannot be performed concurrently with the subject SR-CR. In an alternate embodiment of the invention lockouts are also defined in terms of other layers of the software stack, i.e. web access layer, application layer, database layer, operating system layer to which non-administrative and or administrative access needs to be locked out during execution of the subject SR-CR. Where control passes via SR-CR closure in processes 906-908 to process 924 contention is re-evaluated taking into account the closure of the related SR-CR and any related lockouts. After determining contention control passes to the assignment block 930 where self-scheduling by user selection of SR-CR's from a demand pool may be implemented.

Where access resolution involves both contention and scheduling control passes to process 926. In the first of the scheduling processes 926 the SR-CRs are prioritized or re-prioritized. Prioritization may be made on the basis of parameters including for example: severity and type. Additionally SR-CRs may be prioritized based on the service levels agreements (SLA)s for the associated account and the targeted assets. Any required Lockouts are identified as discussed above in connection with process 924. Next, in process 928 the SR-CRs are scheduled or rescheduled to meet priorities and avoid contention with other SR-CRs for the targeted resources/assets. Where control passes via SR-CR closure in processes 906-908 to processes 926-928 prioritization, contention and scheduling are re-evaluated taking into account the closure of the related SR-CR and any related lockouts. In any event control then passes to processes 928. Processes 930 handle the assignment of users or user types with the newly generated demand. In these processes the new SR-CRs are assigned to specific users to execute them, a.k.a. assigned users, or the new SR-CR are tagged with criteria such as role or skills required in the credentials of a user seeking to execute them, a.k.a. self-selection. In decision process 932 a determination is made as to which embodiment of the user assignment is implemented. If self-selection is implemented then control passes to process 938 in which the roles and or skill sets required to execute the new SR-CRs are determined and these qualification criteria are tagged to the SR-CR after which control returns to process 800 (See FIG. 8). Alternately, if assigned user demand correlation is implemented control passes to process 934 in which a specific user is assigned to each SR-CR to execute it. Assignment may be automatically handled by the access manager based on criteria associated with the corresponding SR-CR or associated SOPs or may be made by a system administrator and executed by the access manager. Next, in process 936 the user is notified, via email for example, of the time slot in which the SR-CR that they are to handle is scheduled. Control then returns to process 800.

In alternate embodiments of the invention demand regulation may be implemented with anyone or more of the four processes of demand mapping, contention identification, scheduling, and correlation of users without departing from the scope of the claimed invention.

Alternate embodiments of the invention may be implemented in hardware, or software. Alternate embodiments of the invention may be implemented on a single network or in an enterprise or hosted context encompassing multiple networks each of which may be physically separated from one another.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

The invention claimed is:

1. A method for controlling access to a plurality of computer resources of a computer data center, said method comprising:
   determining, by one or more processors of a computer system, that a received request targeted to the computer data center to manage an initial service request targets one computer resource of a plurality of computer resources, and in response:
(i) mapping, by the one or more processors, the initial service request to one or more standard operating procedures pertaining to the one computer resource to enable information embedded in the one or more standard operating procedures to be used to process the initial service request;
(ii) determining, by the one or more processors based on the one or more standard operating procedures, that additional service requests are to be spawned to service the initial service request and in response, spawning by the one or more processors, one or more additional service requests;
(iii) correlating, by the one or more processors, the initial service request and the spawned one or more additional service requests to the one computer resource; and
(iv) for service request (SR) of the initial service request and the spawned one or more additional service requests:
  determining, by the one or more processors, selection criteria for selecting a user to execute the SR;
  either: (a) automatically assigning; by the one or more processors, the user to execute the SR based on the selection criteria or (b) tagging, by the one or more processors, the SR with the selection criteria and receive a self-selection by the user based on the user determining that the user satisfies the selection criteria; and
  granting, by the one or more processors, the user the requested access of the one computer resource to enable the user to execute the SR.

2. The method of claim 1, wherein the standard operating procedures are provided for an organization.

3. The method of claim 1, wherein the selection criteria includes an identification of roles and skills to execute the SR.

4. The method of claim 1, wherein said correlating comprises using keyword and other parametric identifiers in the initial service request to scan asset management tables for the one computer resource.

5. The method of claim 1, said method further comprising:
identifying, by the one or more processors, contention of the initial service request with a plurality of existing service requests that target the one computer resource; and
in response to the identified contention, defining, by the one or more processors, lockouts required by the initial service request by matching a plurality of parameters common to the plurality of existing service requests and the initial service request.

6. The method of claim 1, said method further comprising:
prioritizing, by the one or more processors, the initial service request; and
scheduling, by the one or more processors, the initial service request in accordance with the prioritizing of the initial service request, wherein scheduling the initial service request in accordance with the prioritizing of the initial service request avoids contention with a plurality of existing service requests that target the one computer resource.

7. The method of claim 6, wherein said prioritizing comprises prioritizing based on a severity and type of the initial service request.

8. A computer system, comprising one or more processors, one or more memories, and one or more computer readable hardware storage devices; said one or more hardware storage device containing program instructions executable by the one or snore processors via the one or more memories to implement a method for controlling access to a plurality of computer resources of a computer data center, said method comprising:
determining, by the one or more processors, that a received request targeted to the computer data center to manage an initial service request targets one computer resource of a plurality of computer resources, and in response:
(i) mapping, by the one or more processors, the initial service request to one or more standard operating procedures pertaining to the one computer source to enable information embedded in the one or more standard operating procedures to be used to process the initial service request;
(ii) determining, by the one or snore processors based on the one or more standard operating procedures, that additional service requests are to be spawned to service the initial service request and in response, spawning by the one or more processors, one or more additional service requests;
(iii) correlating, by the one or more processors, the initial service request and the spawned one or more additional service requests to the one computer resource; and
(iv) for each service request (SR) of the initial service request and the spawned one or more additional service requests:
  determining, by the one or more processors, selection criteria for selecting a user to execute the SR;
  either: (a) automatically assigning, by the one or more processors, the user to execute the SR based on the selection criteria or (b) tagging, by the one or more processors, the SR with the selection criteria and receive a self-selection by the user based on the user determining that the user satisfies the selection criteria; and
  granting, by the one or more processors, the user the requested access of the one computer resource to enable the user to execute the SR.

9. The computer system of claim 8, wherein the standard operating procedures are provided for an organization.

10. The computer system of claim 8, wherein the selection criteria includes an identification of roles and skills to execute the SR.

11. The computer system f claim 8, wherein said correlating comprises using keyword and other parametric identifiers in the initial service request to scan asset management tables for the one computer resource.

12. The computer system of claim 8, said method further comprising:
identifying, by the one or more processors, contention of the initial service request with a plurality of existing service requests that target the one computer resource; and
in response to the identified contention, defining, by the one or more processors, lockouts required by the initial service request by matching a plurality of parameters common to the plurality of existing service requests and the initial service request.

13. The computer system of claim 8, said method further comprising:
prioritizing, by the one or more processors, the initial service request; and
scheduling, by the one or more processors, the initial service request in accordance with the prioritizing of the initial service request, wherein scheduling the initial service request in accordance with the prioritizing of the initial service request avoids contention with a plurality of existing service requests that target the one computer resource.

14. The computer system of claim 13, wherein said prioritizing comprises prioritizing based on a severity and type of the initial service request.

15. A computer program product, comprising one or more computer readable hardware storage devices having computer readable program instructions stored therein, said program instructions executable by one or more processors of a computer system to implement a method for controlling access to a plurality of computer resources of a computer data center, said method comprising:

determining, by the one or more processors, that a received request targeted to the computer data center to manage an initial service request targets one computer resource of a plurality of computer resources, and in response:

(i) mapping, by the one or more processors, the initial service request to one or more standard operating procedures pertaining to the one computer resource to enable information embedded in the one or more standard operating procedures to be used to process the initial service request;

(ii) determining, by the one or more processors based on the one or more standard operating procedures, that additional service requests are to be spawned to service the initial service request and in response, spawning by the one or more processors, one or more additional service requests;

(iii) correlating, by the one or more processors, the initial service request and the spawned one or more additional service requests to the one computer resource; and (iv) for each service request (SR) of the initial service request and the spawned one or more additional service requests:

determining, by the one or more processors, selection criteria for selecting a user to execute the SR;
either: (a) automatically assigning, by the one or more processors, the user to execute the SR based on the selection criteria or (b) tagging, by the one or more processors, the SR with the selection criteria and receive a self-selection by the user based on the user determining that the user satisfies the selection criteria; and granting, by the one or more processors, the user the requested access of the one computer resource to enable the user to execute the SR.

16. The computer program product of claim 15, wherein the standard operating procedures are provided for an organization.

17. The computer program product of claim 15, wherein the selection criteria includes an identification of roles and skills to execute the SR.

18. The computer program product of claim 15, wherein said correlating comprises using keyword and other parametric identifiers in the initial service request to scan asset management tables for the one computer resource.

19. The computer program product of claim 15, said method further comprising:

identifying, by the one or more processors, contention of the initial service request with a plurality of existing service requests that target the one computer resource; and in response to the identified contention, defining, by the one or more processors, lockouts required by the initial service request by matching a plurality of parameters common to the plurality of existing service requests and the initial service request.

20. The computer program product of claim 15, said method further comprising:

prioritizing, by the one or more processors, the initial service request; and scheduling, by the one or more processors, the initial service request in accordance with the prioritizing of the initial service request, wherein scheduling the initial service request in accordance with the prioritizing of the initial service request avoids contention with a plurality existing service requests that target the one computer resource.

* * * * *